(12) United States Patent
Chen

(10) Patent No.: US 6,979,017 B2
(45) Date of Patent: Dec. 27, 2005

(54) FOLDABLE FRAME ASSEMBLY FOR A FOLDABLE STROLLER

(75) Inventor: Shun-Min Chen, Taipei (TW)

(73) Assignee: Wonderland Nurserygoods Co., Ltd., Taipei (TW)

( * ) Notice: Subject to any disclaimer, the term of this patent is extended or adjusted under 35 U.S.C. 154(b) by 180 days.

(21) Appl. No.: 10/644,663

(22) Filed: Aug. 19, 2003

(65) Prior Publication Data

US 2005/0040625 A1   Feb. 24, 2005

(51) Int. Cl.$^7$ ............................................. B62B 1/00
(52) U.S. Cl. ..................................................... 280/642
(58) Field of Search ............................... 280/642, 647, 280/643, 648, 649, 650, 657, 658, 644; 16/113.1; 74/501.6

(56) References Cited

U.S. PATENT DOCUMENTS

| | | | |
|---|---|---|---|
| 6,086,087 A * | 7/2000 | Yang | 280/658 |
| 6,585,284 B2 * | 7/2003 | Sweeney et al. | 280/650 |
| 6,676,140 B1 * | 1/2004 | Gondobintoro | 280/33.993 |
| 6,739,616 B2 * | 5/2004 | Lin | 280/642 |
| 6,877,760 B2 * | 4/2005 | Wang | 280/642 |
| 2003/0201626 A1 * | 10/2003 | Hartenstine et al. | 280/642 |
| 2003/0227157 A1 * | 12/2003 | Bretschger et al. | 280/642 |
| 2004/0041368 A1 * | 3/2004 | Cheng | 280/642 |

* cited by examiner

Primary Examiner—Bryan Fischmann
(74) Attorney, Agent, or Firm—The Webb Law Firm

(57) ABSTRACT

A foldable frame assembly for a foldable stroller includes left and right frame units including three parts. At least one of the three parts includes an anchored coupler with an anchored region, and an anchoring coupler extending in the same axis as the anchored region. A locking unit includes a socket and a plug which are respectively disposed on the anchored region and a proximate segment of the anchoring coupler, and which are movable relative to each other along the axis between locked and unlocked positions. A linkage includes an engaging end engaging a distal segment of the anchoring coupler, and a coupling end pivoted to a pivoted end of a linking lever such that an opposite connected end of the linking lever can turn about the pivot axis when the locking unit is in the unlocked position, thereby enabling folding of the foldable frame assembly.

9 Claims, 8 Drawing Sheets

US 6,979,017 B2

FOLDABLE FRAME ASSEMBLY FOR A FOLDABLE STROLLER

BACKGROUND OF THE INVENTION

1. Field of the Invention

This invention relates to a foldable frame assembly for a foldable stroller, more particularly to a foldable frame assembly that has a simple construction and that is easy to fabricate at a relatively low cost.

2. Description of the Related Art

A conventional foldable frame assembly for a foldable stroller generally includes a handle with two tube ends pivoted to a rear frame portion that carries rear wheels so as to be turnable between folded and unfolded positions. To prevent undesired folding of the handle, two locking mechanisms are respectively provided with first and second coupling members which are respectively disposed on the respective tube end of the handle and the rear frame portion, and a slidable member which is slidable to lock and unlock the first and second coupling members. However, the locking mechanisms generally have a complicated construction, and are required to be fabricated with precision. Thus the conventional foldable frame assembly is costly and time-consuming to manufacture.

SUMMARY OF THE INVENTION

The object of the present invention is to provide a foldable frame assembly for a foldable stroller which has a simple construction, and which is easy to fabricate at a relatively low cost.

According to this invention, the foldable frame assembly includes left and right frame units which are spaced apart from each other in a longitudinal direction. The left frame unit is adapted to carry and is disposed upwardly of front and rear left wheels, and the right frame unit is adapted to carry and is disposed upwardly of front and rear right wheels. One of the left and right frame units includes an anchored coupler, an anchoring coupler, a locking unit, a linking lever, and a linkage. The anchored coupler defines a first axis, and has an anchored region extending along one of a second axis that is parallel to and that is offset from the first axis, and a radial line relative to the first axis. The anchoring coupler has a proximate segment and a distal segment extending from the proximate segment along said one of the second axis and the radial line. The locking unit includes a socket which is disposed on one of the anchored region and the proximate segment, and a plug which is disposed on the other one of the anchored region and the proximate segment. The socket and the plug mate with each other, and are movable relative to each other along said one of the second axis and the radial line and between a locked position, where the proximate segment of the anchoring coupler is prevented from moving away from the anchored region along said one of the second axis and the radial line, and an unlocked position, where the proximate segment is permitted to be turned about a third axis which extends in the longitudinal direction. The linking lever defines a length, and has a connected end and a pivoted end opposite to the connected end along the length. The linkage includes an engaging end engaging the distal segment, and a coupling end pivoted to the pivoted end about the third axis such that the connected end is turnable about the third axis to permit folding of the foldable frame assembly when the locking unit is in the unlocked position.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
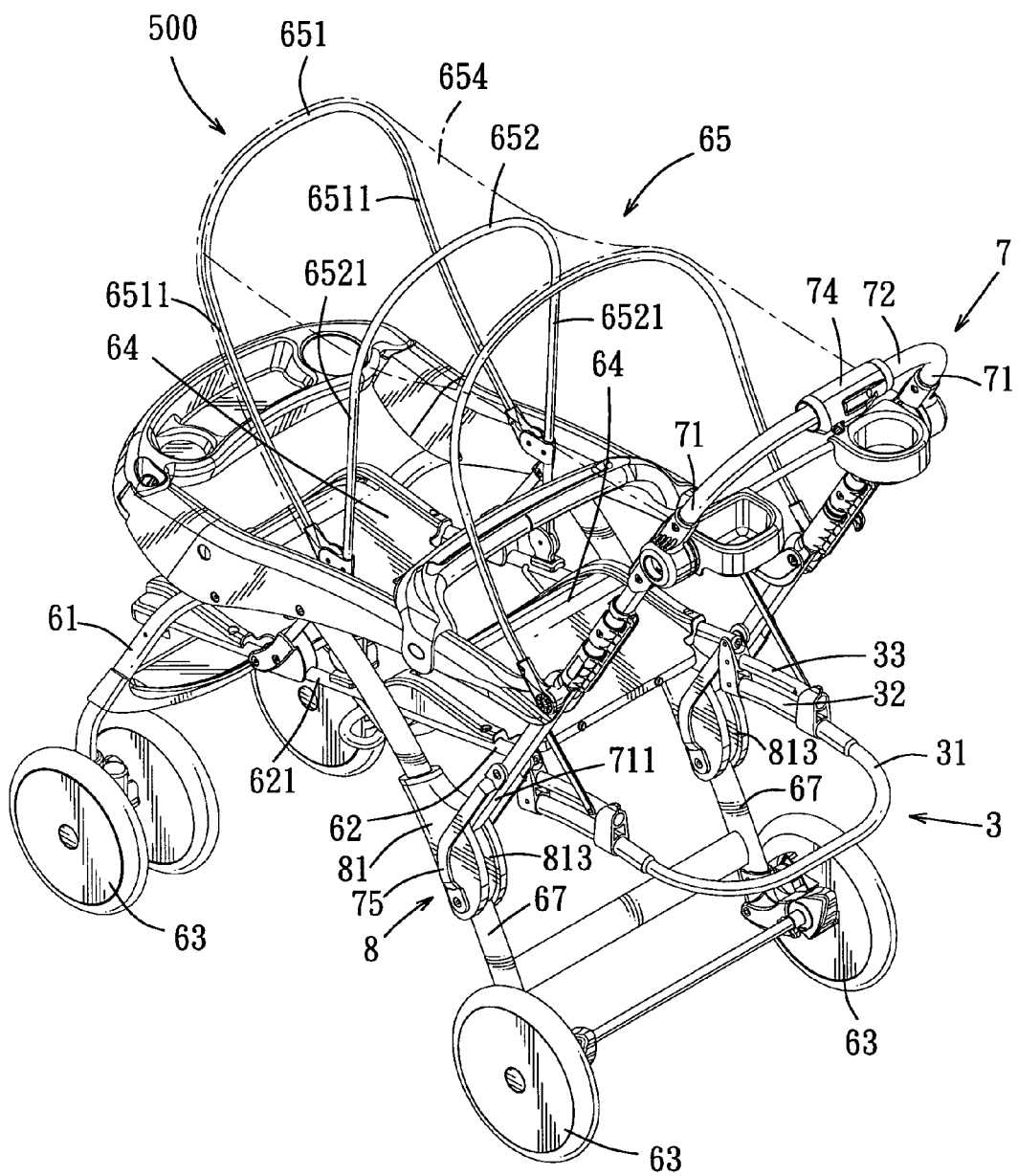
FIG. 1 is a perspective view of the preferred embodiment of a foldable frame assembly according to this invention.

Referring to FIG. 1, the preferred embodiment of a foldable frame assembly according to the present invention is shown to be adapted for use in a foldable stroller, such as a tandem stroller 500 in this embodiment. The tandem stroller 500 includes front left and front right wheels 63 spaced apart from each other in a longitudinal direction, rear left and rear right wheels 63 spaced apart from each other in the longitudinal direction and spaced apart from the front left and front right wheels 63, respectively, in a transverse direction, and a handle 72 extending in the longitudinal direction and spaced apart from the rear left and rear right wheels 63 in an upright direction that is transverse to the transverse direction and the longitudinal direction.

The foldable frame assembly is shown to comprise complementary left and right frame units which are spaced apart from each other in the longitudinal direction. The left frame unit is adapted to carry and is disposed upwardly of the front and rear left wheels 63. The right frame unit is adapted to carry and is disposed upwardly of the front and rear right wheels 63. Each of the left and right frame units includes first, second and third parts 8,65,3. In addition, each of the right and left frame units includes front and rear frame shafts 61,67 which are adapted to carry a corresponding one of the front right and left wheels 63 and a corresponding one of the rear right and left wheels 63.

Each of the first, second and third parts 8,65,3 includes a corresponding anchored coupler 81,621,37, respectively, a corresponding anchoring coupler 71,6521,33, respectively, a locking unit, a corresponding linking lever 62,6511,32, respectively, and a corresponding linking 713,655,38, respectively, which will be described in detail hereinafter.

Figure 2:
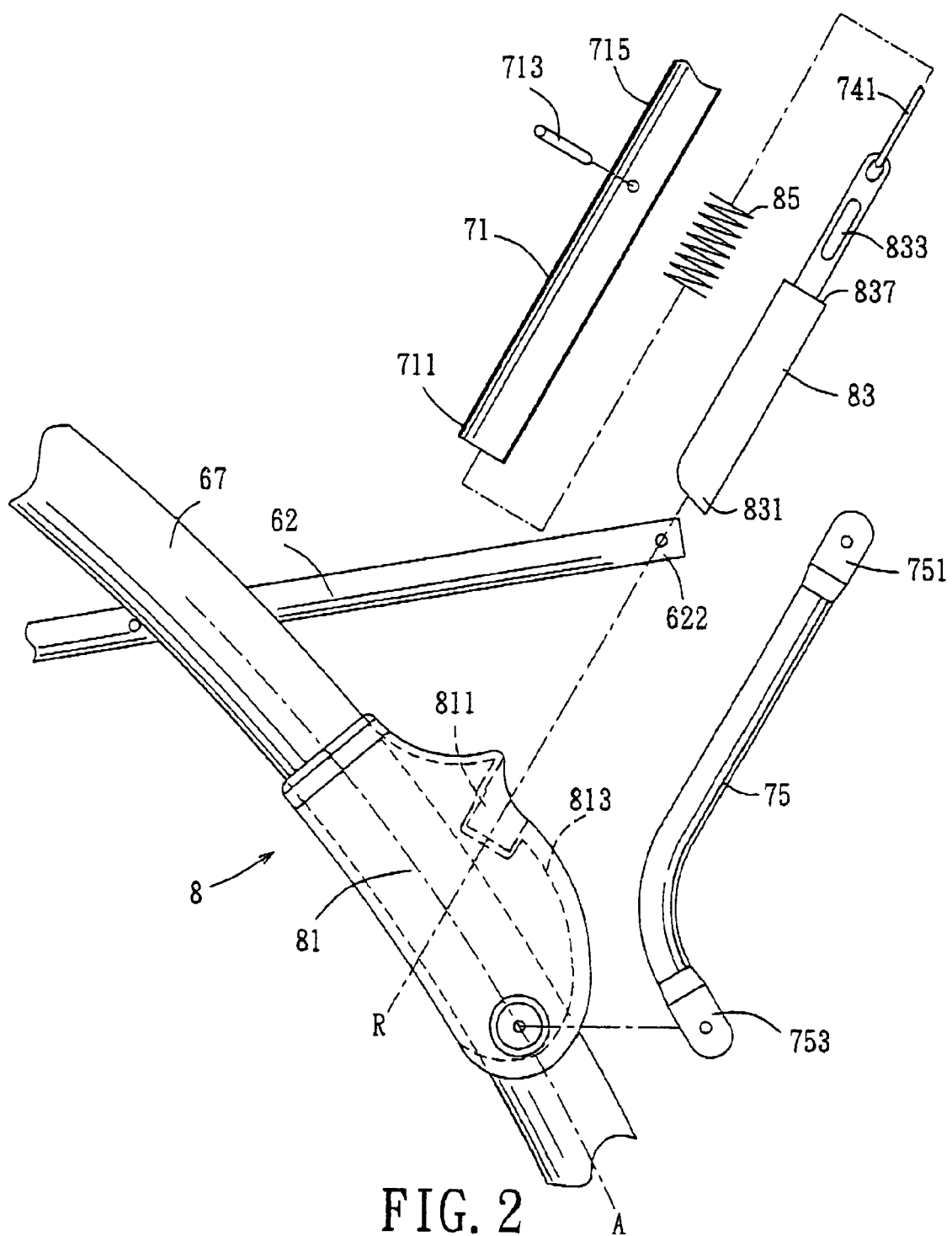
FIG. 2 is an exploded fragmentary side view of a first part of the preferred embodiment.
Figure 3:
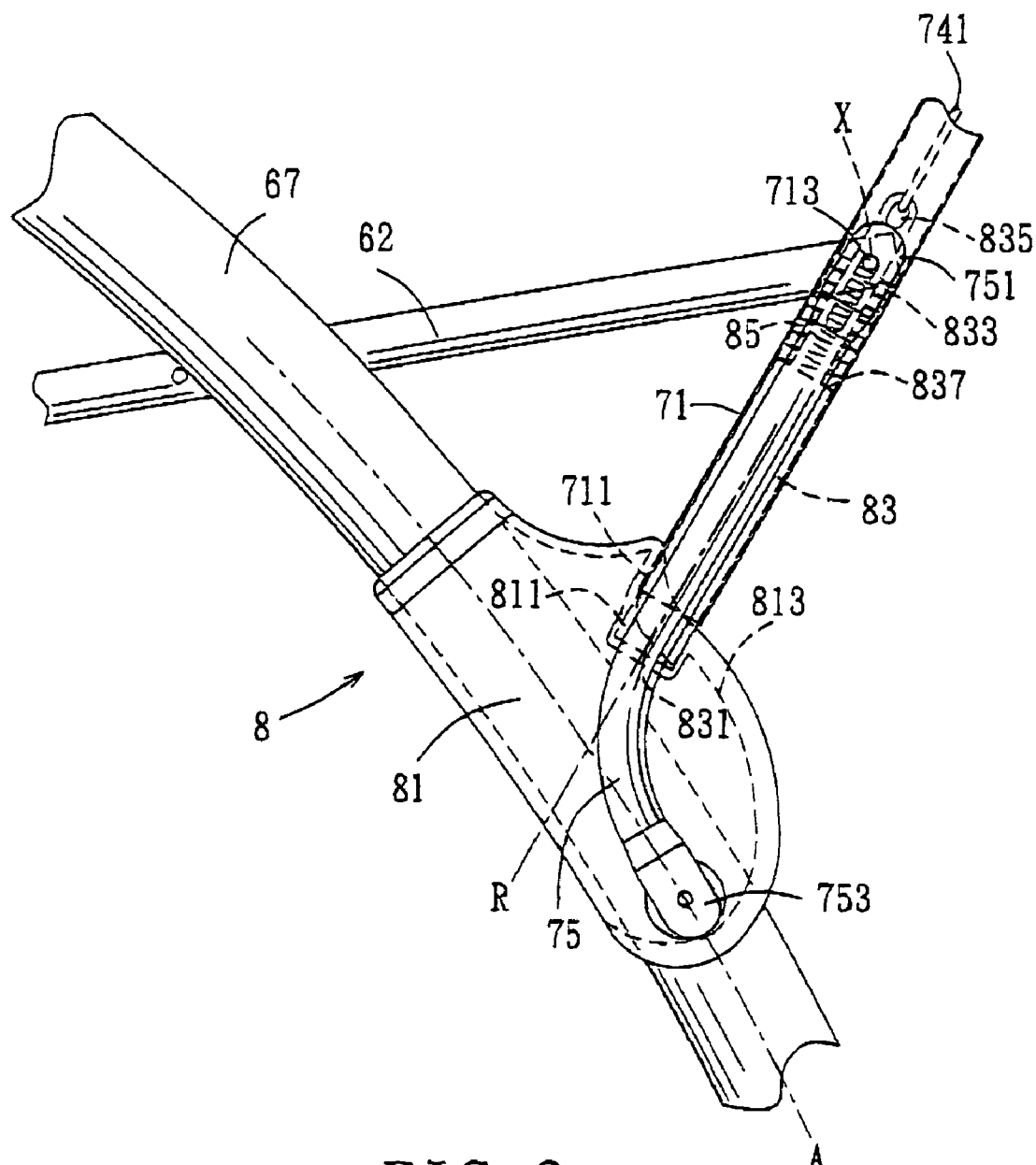
FIG. 3 is a schematic fragmentary side view of the first part of the preferred embodiment in a locked state.

In the first part 8, as shown in FIGS. 1 to 3, the anchored coupler 81 is sleeved on the rear frame shaft 67, and defines a first axis (A) in a lengthwise direction of the rear frame shaft 67. The anchored coupler 81 has an anchored region formed with a concavity or socket 811 which extends along a radial line (R) relative to the first axis (A) to serve as a socket 811 of the locking unit.

The anchoring coupler 71 has a proximate segment 711 and a distal segment 715 extending from the proximate segment 711 along the radial line (R). The distal segment 715 is connected integrally to the handle 72 so that the anchoring couplers 71 of the left and right frame units and the handle 72 cooperatively form a handle assembly 7.

The locking unit of the first part 8 includes a plug 83 which is disposed in and which is movable relative to the anchoring coupler 71 along the radial line (R) so that an end edge 831 of the plug 83 can be retracted into or project outwardly of the proximate segment 711 to disengage from or to extend into the concavity 811 so as to dispose the plug 83 in an unlocked position or a locked position. The plug 83 has an elongated slot 833 that is elongated in a direction parallel to the radial line (R) and that has two limit ends.

The linking lever 62 defines a length in the transverse direction, and has a connected end and a pivoted end 622 opposite to the connected end along the length. The linkage 713 is formed as a pin, and includes an engaging end which engages the distal segment 715 of the anchoring coupler 71 and which is slidably disposed in the elongated slot 833, and a coupling end pivoted to the pivoted end 622 of the linking lever 62 about a third axis (X) that extends in the longitudinal direction such that the connected end of the linking lever 62 is turnable about the third axis (X).

Figure 4:
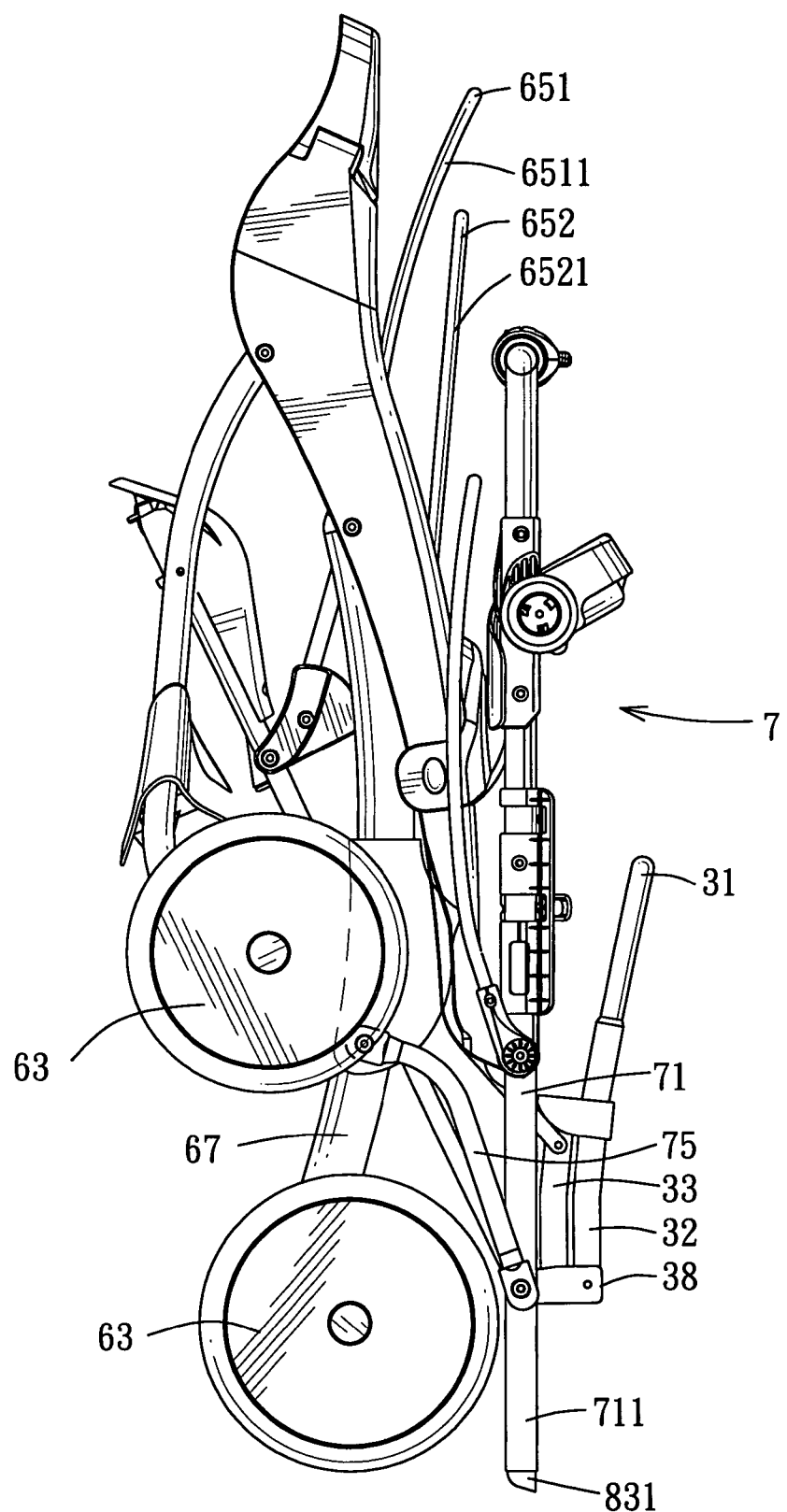
FIG. 4 is a side view of the preferred embodiment when folded.
Figure 5:
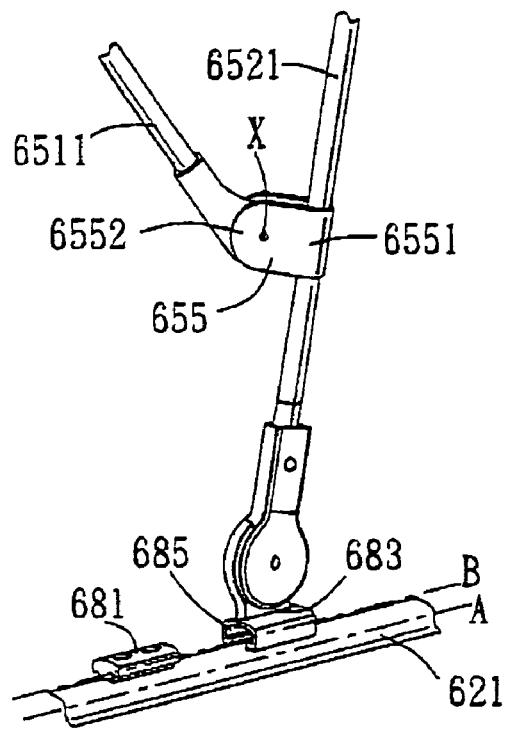
FIG. 5 is a fragmentary perspective view of a second part of the preferred embodiment.
Figure 6:
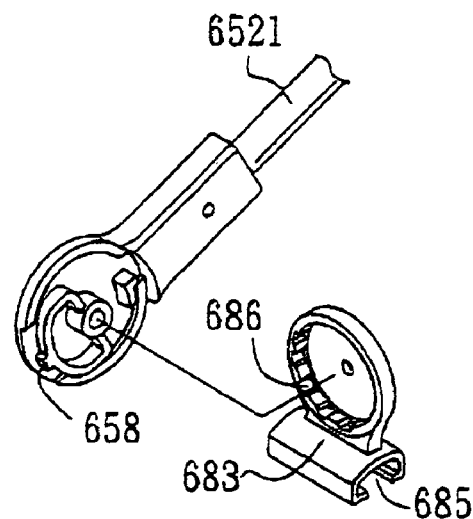
FIGS. 6 and 7 are exploded fragmentary perspective views of two portions of the second part.
Figure 7:
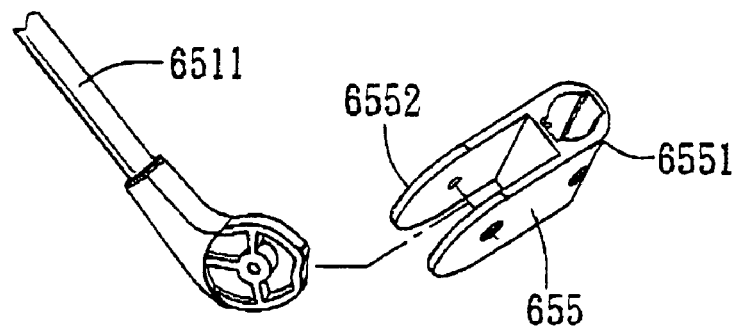
Figure 8:
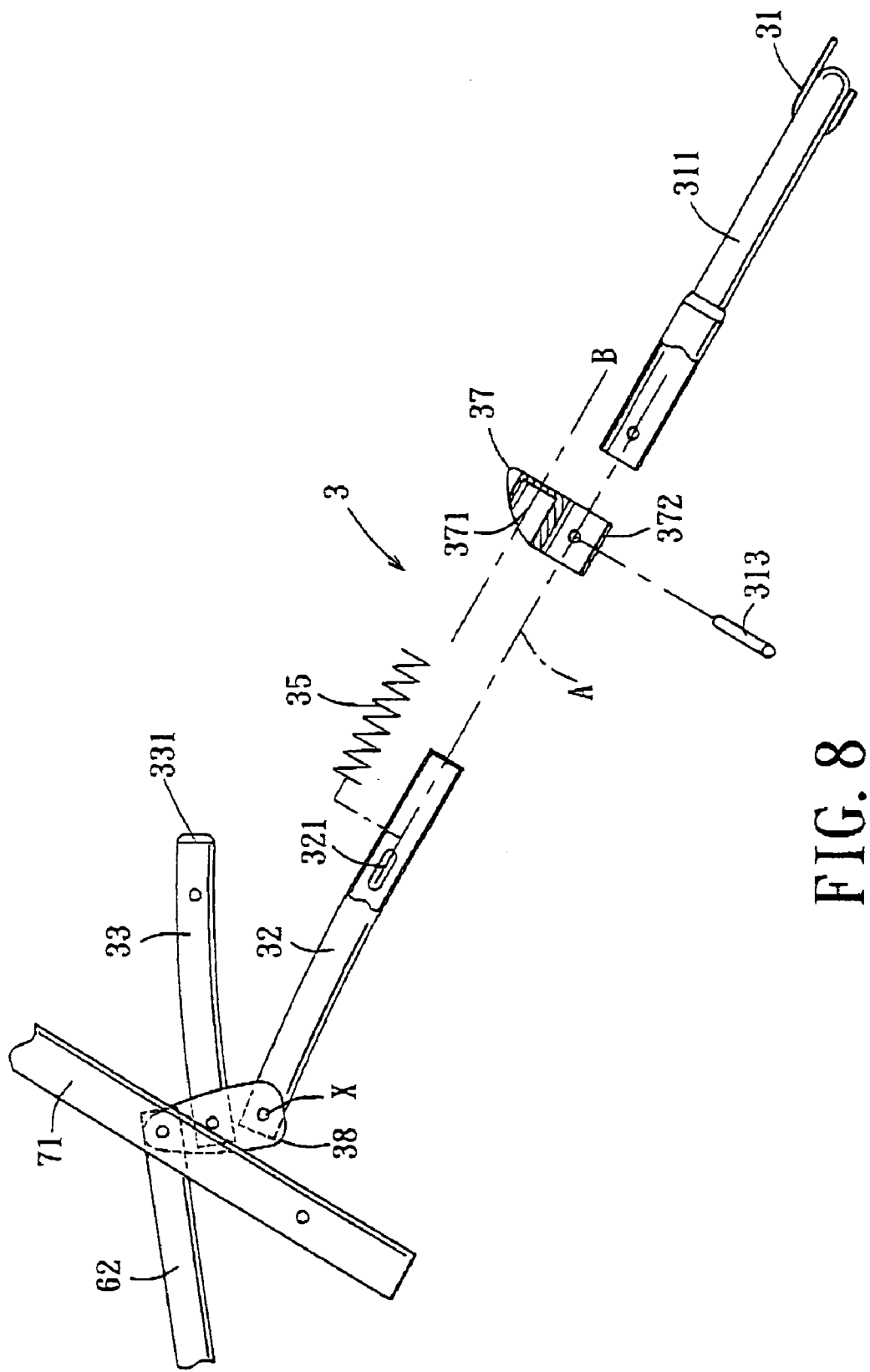
FIG. 8 is an exploded, fragmentary partly sectioned side view of a third part of the preferred embodiment.
Figure 9:
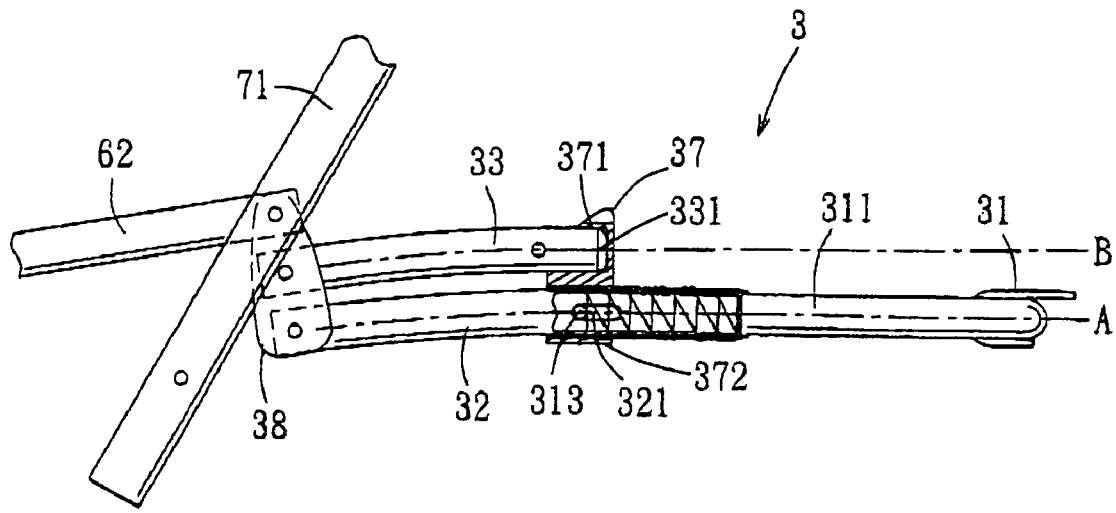
FIGS. 9 and 10 are fragmentary partly sectioned side view showing the third part in locked and unlocked states, respectively.

Thus, when the plug 83 is inserted into the concavity 811, i.e. in the locked position, the proximate segment 711 of the anchoring coupler 71 is prevented from moving away from the anchored region along the radial line (R) so as to immobilize the anchoring coupler 71 and the linking lever 62. When the end edge 831 of the plug 83 is retracted into the proximate segment 711 to disengage from the concavity 811, i.e. in the unlocked position, the proximate segment 711 of the anchoring coupler 71 and the connected end of the linking lever 62 are turnable about the third axis (X) to permit folding of the foldable frame assembly, as shown in FIG. 4.

In addition, the limit ends of the elongated slot 833 can limit an extent of movement of the plug 83 relative to the anchored coupler 81.

In order to move the plug 83, an actuator 74 is mounted on the handle 72. A pulling cord 741 is disposed in a channel 835 in the distal segment 715 of the anchoring coupler 71, and interconnects the actuator 74 and the plug 83. The locking unit of the first part 8 also includes a biasing member 85, such as a biasing spring, which is disposed to surround the plug 83 and abuts against a shoulder 837 so as to bias the plug 83 to the locked position. Therefore, when the actuator 74 is operated to pull the pulling cord 741 against the biasing action of the biasing member 85, the end edge 831 of the plug 83 is moved to disengage from the concavity 811.

The anchored coupler 81 further has a guiding groove 813 which is communicated with the concavity 811, and which is configured to be arcuate in shape so as to permit sliding movement of the end edge 831 of the plug 83 along the guiding groove 813 into the concavity 811 when the foldable frame assembly is being unfolded.

Furthermore, a substantially L-shaped connecting rod 75 has an end 753 pivoted to the rear frame shaft 67, and an opposite end 751 anchored to the engaging end of the linkage 713 so as to help bracing up the anchoring coupler 71, thereby facilitating the sliding movement of the plug 83 into the concavity 811.

In the second part 65, as shown in FIG. 1 and FIGS. 5 to 7, the anchored coupler 621 is formed integrally with and extends forwardly from the connected end of the linking lever 62 in the transverse direction, and cooperates with the linking lever 62 to define front and rear seat portions 64 of the foldable frame assembly. The plug 681 of the locking unit of the second part 65 is disposed on the anchored coupler 621, and has a T-shaped cross-section.

The anchoring coupler 6521 is formed as a shaft. The anchoring couplers 6521 of the left and right frame units are interconnected by a longitudinal shaft 652 to cooperatively form a substantially U-shaped shaft that straddles the front seat portion 64. The linking lever 6511 is also formed as a shaft. The connected ends of the linking levers 6511 of the left and right frame units are interconnected by a longitudinal shaft 651 to cooperatively form a substantially U-shaped shaft that straddles the front seat portion 64. The linkage 655 has the engaging end 6551 sleeved on the distal segment of the anchoring coupler 6521, and has the coupling end 6552 frictionally pivoted to the linking lever 6511 about the third axis (X) such that the connected end of the linking lever 6511 can be turned about the third axis (X) to permit folding and spreading of a canopy 654.

The proximate segment of the anchoring coupler 6521 of the second part 65 is slidable relative to the plug 681 along a second axis (B) that extends in the transverse direction and that is parallel to and that is offset from the first axis (A). The proximate segment of the anchoring coupler 6521 has a flexible retaining portion 658, and a connecting member 683 which includes a plurality of angularly displaced engaging slots 686, and a T-shaped sliding groove 685 which can serve as the socket of the locking unit and which mates with the plug 681 to engage and disengage from the plug 681. The flexible retaining portion 658 can engage a selected one of the engaging slots 686 to maintain an angular position of the anchoring coupler 6521 relative to the anchored coupler 621.

Figure 10:
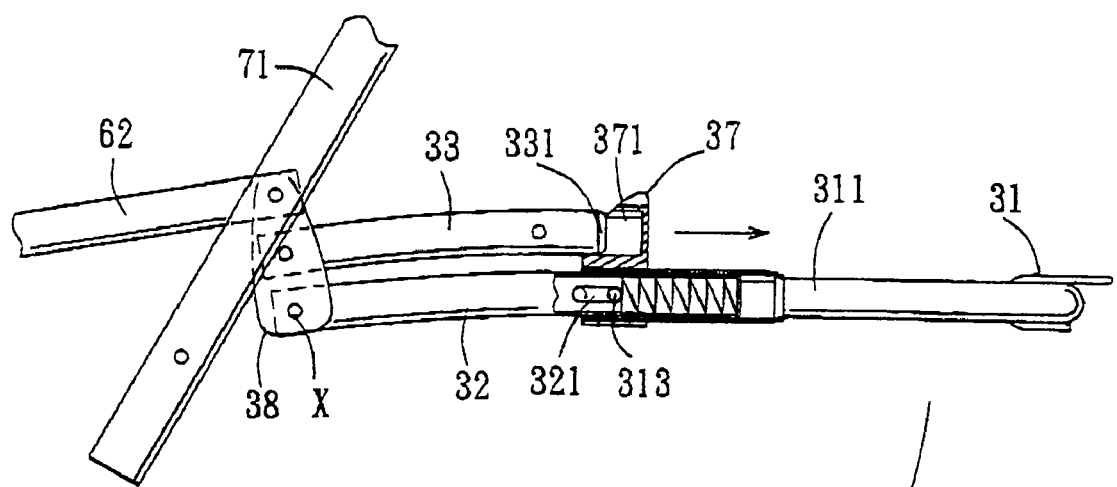
Figure 11:
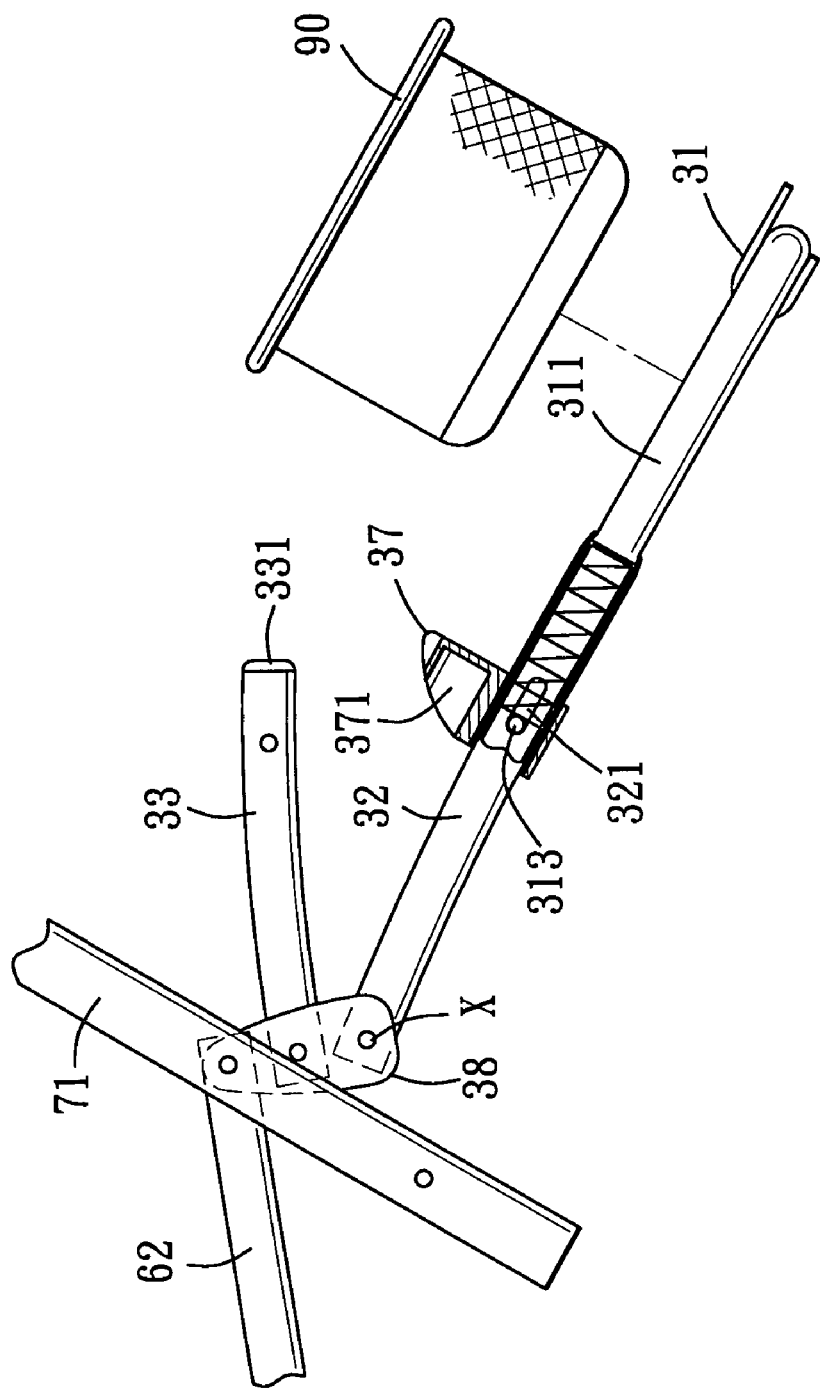
FIG. 11 is a fragmentary partly sectioned side view showing a state that in which a bracing member of the third part is turned downwardly.

As shown in FIG. 1 and FIGS. 8 to 11, the third part 3 is mounted rearwardly of the linking lever 62 of the first part 8 for mounting a basket 90. In the third part 3, the linking lever 32 extends in parallel to the anchoring coupler 33 in the transverse direction, and has the connected end formed with an elongated slot 321 that is elongated along the first axis (A) in the transverse direction. The anchored coupler 37 has a sleeve portion 372 which is slidably sleeved on the connected end along the first axis (A), and a pin 313 which is disposed radially of the sleeve portion 372 and which is inserted into and which is movable along the elongated slot 321, thereby permitting the anchored coupler 37 to move in the transverse direction. The linkage 38 has the engaging end engaging the anchoring coupler 33, and has the coupling end pivoted to the pivot end of the linking lever 32 about the third axis (X) such that the connected end of the linking lever 32 is turnable about the third axis (X). The plug 331 of the third part is formed on the proximate segment of the anchoring coupler 33. The socket 371 is formed on the anchored region of the anchored coupler 37 such that movement of the anchored coupler 37 relative to the linking lever 32 permits the socket 371 to engage or disengage from the plug 331. In addition, the biasing member 35 of the third part 3 is disposed in the linking lever 32 and abuts against the pin 313 so as to bias the socket 371 to engage the plug 331. A lateral arm portion 311 of a U-shaped bracing member 31 is connected to the connected end of the linking lever 32 by means of the pin 313. When the anchored coupler 37 is moved to the unlocked position, where the socket 371 is disengaged from the plug 331, as shown in FIG. 10, the bracing member 31 can be turned about the third axis (X) so as to facilitate placement and removal of the basket 90 on and from the bracing member 31, as shown in FIG. 11.

As illustrated, the foldable frame assembly according to this invention has a simple construction that is easy to fabricate at a relatively low manufacturing cost.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A foldable frame assembly for use in a foldable stroller which includes front left and front right wheels spaced apart from each other in a longitudinal direction, rear left and rear right wheels spaced apart from each other in the longitudinal direction and spaced apart from said front left and front right wheels respectively in a transverse direction, and a handle extending in the longitudinal direction and spaced apart from the rear left and rear right wheels in an upright direction that is transverse to the transverse direction and the longitudinal direction, said foldable frame assembly comprising:

left and right frame units which are spaced apart from each other in the longitudinal direction, said left frame unit being adapted to carry and to be disposed upwardly of the front and rear left wheels, said right frame unit being adapted to carry and to be disposed upwardly of the front and rear right wheels, one of said left and right frame units including three parts, wherein at least one of the three parts comprises:

an anchored coupler which defines a first axis, and which has an anchored region extending along one of a second axis that is parallel to and that is offset from the first axis, and a radial line relative to the first axis, an anchoring coupler which has a proximate segment and a distal segment extending from said proximate segment along said one of the second axis and the radial line, a locking unit including a socket which is disposed on one of said anchored region and said proximate segment, and a plug which is disposed on the other one of said anchored region and said proximate segment, said socket and said plug being configured to mate with each other and to be movable relative to each other along said one of the second axis and the radial line and between a locked position, where said proximate segment is prevented from moving away from said anchored region along said one of the second axis and the radial line, and an unlocked position, where said proximate segment is permitted to be turned about a third axis which extends in the longitudinal direction, a linking lever which defines a length, and which has a connected end and a pivoted end opposite to said connected end along the length, and a linkage including an engaging end engaging said distal segment, and a coupling end pivoted to said pivoted end about the third axis such that when said locking unit is in the unlocked position, said connected end is turnable about the third axis to permit folding of said foldable frame assembly.

2. The foldable frame assembly of claim 1, wherein each of said left and right frame units includes a rear frame shaft adapted to carry a respective one of the rear right and rear left wheels, said anchored coupler being sleeved on said rear frame shaft and being formed with a concavity which extends along the radial line to serve as said socket, said plug being disposed in and being movable relative to said anchoring coupler along the radial line to be retracted into or to project outwardly of said proximate segment so as to disengage from or to extend into said concavity to dispose said plug in the unlocked position or the locked position.

3. The foldable frame assembly of claim 2, wherein said distal segment of said anchoring coupler is adapted to be connected to said handle, and has a channel therein, said foldable frame assembly further comprising an actuator which is adapted to be mounted on the handle, a pulling cord which is disposed in said channel and which interconnects said actuator and said plug such that when said actuator is operated to pull said pulling cord, said plug is moved to disengage from said concavity, and a biasing member which is disposed to bias said plug to the locked position.

4. The foldable frame assembly of claim 3, wherein said plug has an elongated slot elongated in a direction parallel to the radial line and having two limit ends, said engaging end of said linkage extending into said elongated slot so as to limit an extent of movement of said plug relative to said anchored coupler.

5. The foldable frame assembly of claim 4, wherein said anchored coupler further has a guiding groove communicated with said concavity and configured to permit sliding movement of said plug along said guiding groove into said concavity when said plug is brought to move from the unlocked position to the locked position.

6. The foldable frame assembly of claim 5, further comprising a connecting rod which has an end pivoted to said rear frame shaft and an opposite end anchored to said engaging end of said linkage so as to support said anchoring coupler, thereby facilitating sliding movement of said plug into said concavity.

7. The foldable frame assembly of claim 1, wherein the first and second axes extend in the transverse direction, said plug being disposed on said anchored region of said anchored coupler and extending along the second axis, said socket being disposed on said proximate segment of said anchoring coupler and being slidable along the second axis so as to engage or disengage from said plug.

8. The foldable frame assembly of claim 1, wherein the first and second axes extend in the transverse direction, said linking lever extending in parallel to said anchoring coupler, and having an elongated slot which is elongated in the transverse direction, said anchored coupler further having a sleeve portion which is slidably sleeved on said connected end of said linking lever along the first axis, and a pin which is disposed radially of said sleeve portion and which is inserted into and which is movable along said elongated slot, thereby permitting said anchored coupler to move in the transverse direction, said plug being formed on said proximate segment of said anchoring coupler, said socket being formed on said anchored region such that movement of said anchored coupler relative to said linking lever permits said socket to engage or disengage from said plug.

9. The foldable frame assembly of claim 8, wherein said locking unit further includes a biasing member disposed to bias said socket to the locked position.

* * * * *